United States Patent
Oprea

(10) Patent No.: US 8,510,566 B1
(45) Date of Patent: Aug. 13, 2013

(54) AUTHENTIC TIME-STAMPING FOR ARCHIVAL STORAGE

(75) Inventor: Alina Oprea, Waltham, MA (US)

(73) Assignee: EMC Corporation, Hopkinton, MA (US)

( * ) Notice: Subject to any disclaimer, the term of this patent is extended or adjusted under 35 U.S.C. 154(b) by 623 days.

(21) Appl. No.: 12/568,722

(22) Filed: Sep. 29, 2009

(51) Int. Cl.
*H04L 9/00* (2006.01)

(52) U.S. Cl.
USPC ............ 713/181; 713/176; 713/177; 713/178

(58) Field of Classification Search
USPC ................. 713/176, 177, 178, 181; 707/697, 707/698, 802, 806
See application file for complete search history.

(56) References Cited

U.S. PATENT DOCUMENTS

2010/0212017 A1* 8/2010 Li et al. ............................ 726/26

* cited by examiner

*Primary Examiner* — Edward Zee
*Assistant Examiner* — Baotran N To
(74) *Attorney, Agent, or Firm* — Krishnendu Gupta; Joseph D'Angelo

(57) ABSTRACT

A computer system to authenticate documents periodically appending a hash representing a document to a data structure, the data structure configured to store one or more hashes and creating a commitment for the data structure at pre-established intervals by creating a digest of the one or more hashes of the of the data structure, wherein the size of the commitment is constant regardless of the number of hashes in the data structure. A method, system, and computer product for verifying the existence of a document comprising postulating a state of existence of the document, obtaining, from a server, a proof of existence of the document at a time T, obtaining, from a trusted medium, a commitment for time T, and testing the postulate by determining whether there is a pre-established correspondence between the proof obtained from the server and the commitment obtained from the trusted medium, wherein a successful determination establishes the postulate is true and wherein a negative comparison establishes the postulate is false.

20 Claims, 23 Drawing Sheets

UNOPTIMIZED TRIE FOR STRINGS D1 = 010, D2 = 011 AND D3 = 110

OPTIMIZED PATRICIA TREE FOR
STRINGS D1 = 010, D2 = 011 AND D3 = 110

US 8,510,566 B1

AUTHENTIC TIME-STAMPING FOR ARCHIVAL STORAGE

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records and is made available to third parties in accordance with Patent and Trademark Office rules, but otherwise reserves all copyright rights whatsoever.

TECHNICAL FIELD

This invention relates to time stamping for archival storage.

BACKGROUND

There are some applications in which it is necessary or highly advantageous to be able to prove that a file has not been altered. By non-alterable it is meant that the data in the file can not be altered without leaving some sort of audit trail concerning that change. For example, insurance policies, while being written, are subject to change while they are being negotiated or compiled; once the insurance policy is issued, both the insurance company and policy holder want to be sure any change to that policy is detected. Similar requirements for permanence exist for medical records, images, and governmental compliance requirements.

Typical solutions offered to show that a file has not been altered may include WORM (Write-Once-Read-Many) storage. WORM storage is generally available in two types, a hardware or media implementation, which tends to be expensive, and a software implementation. Due to the high cost of the WORM media i.e. CDs or DVD ROMS, WORM is usually created in software and uses hard disks as the underlying storage media. The software WORM products are vulnerable to insider attacks by those with full access privileges and control of the storage system that can easily compromise the integrity of data stored on the disk. As well, typical systems do not provide for both existence and non-existence proofs.

SUMMARY

In one aspect, the invention comprises a computer system to authenticate documents by periodically appending a hash representing a document to a data structure, the data structure configured to store one or more hashes and creating a commitment for the data structure at pre-established intervals by creating a digest of the one or more hashes of the of the data structure, wherein the size of the commitment is constant regardless of the number of hashes in the data structure. In another aspect, the invention comprises a method, system, and computer product for verifying the existence of a document, comprising: postulating a state of existence of the document: obtaining, from a server, a proof of existence of the document at a time T: obtaining, from a trusted medium, a commitment for time T; and testing the postulate by determining whether there is a pre-established correspondence between the proof obtained from the server and the commitment obtained from the trusted medium, wherein a successful determination establishes the postulate is true and wherein a negative comparison (in the case of postulated existence, any other finding) establishes the postulate is false.

DETAILED DESCRIPTION

Figure 1:
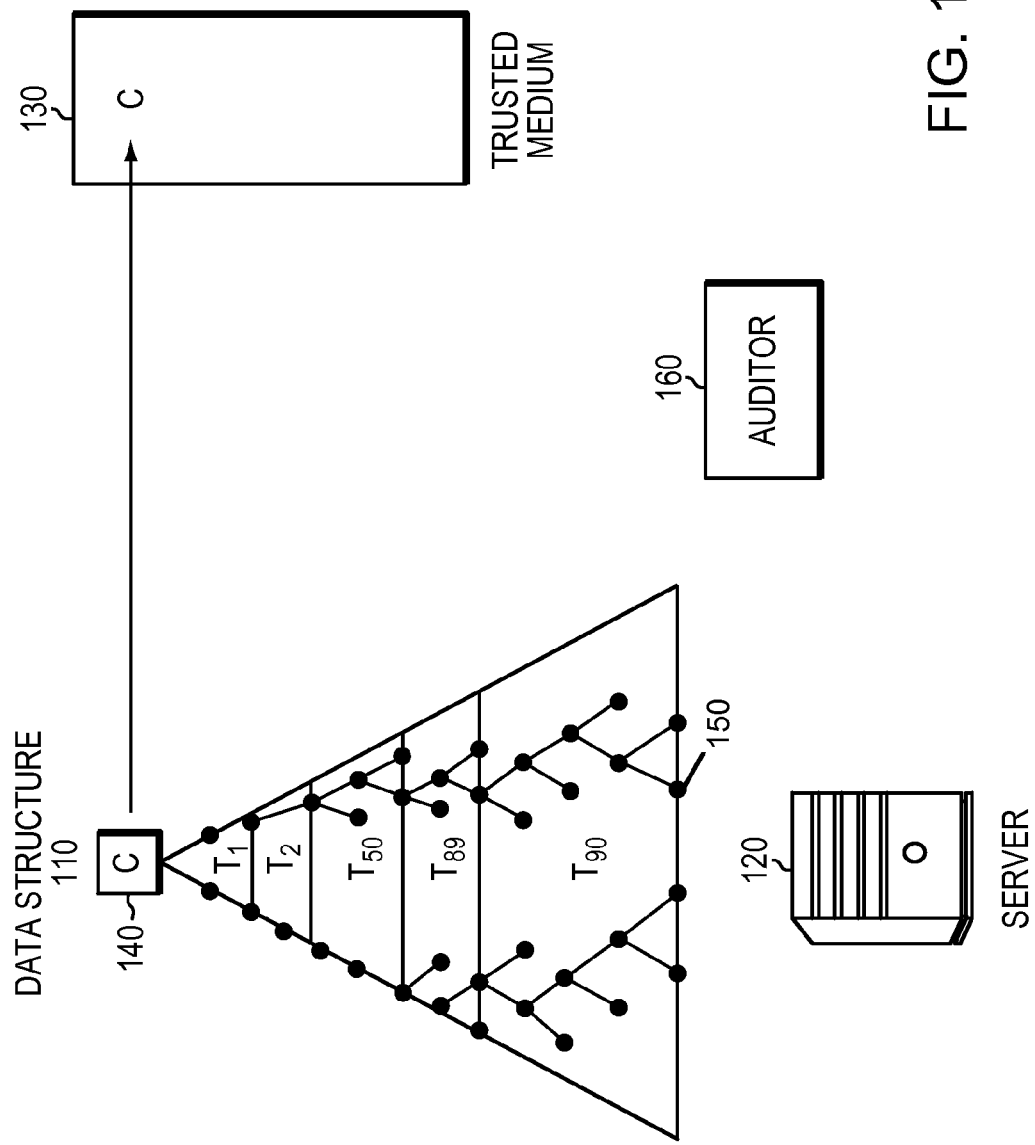
FIG. 1 shows an embodiment of a system on which the current techniques may be practiced.

Due to numerous regulations, including the recent eDiscovery laws, the Sarbanes-Oxley act and the Securities and Exchange Commission rules, there is a need for electronic data to be securely retained and made available in a number of circumstances. A typical challenge in complying with existing regulations is ensuring that electronic records have not been inadvertently or maliciously altered. The integrity of the records themselves may need to be maintained, and also the integrity of metadata information, such as creation time or non-existence of a document. Often organizations may have incentives to modify the creation time of their documents either forward or backward in time. For example, document back-dating might enable a company to claim intellectual property rights for an invention that had been discovered by its competitor first. A party involved in litigation might be motivated to change the date on which an email was sent or received, or to disguise the existence of a document.

Existing solutions offered by industrial products may implement WORM (Write-Once-Read-Many) storage, as previously described. Other solutions may be based on secure co-processors that defend against document tampering by an inside adversary; however, this may come at a substantial performance overhead.

Other solutions, such as external time-stamping services, can be leveraged for authenticating a few important documents, but these solutions are usually not scalable to large document repositories. This is because each document to be time stamped is usually sent to an external time stamping resource which must stamp and store the document. In addition, typical time stamping solutions may prevent back-dating and establish the relative ordering of documents, but previous time-stamping solutions do not prevent forward-dating as users could obtain multiple time-stamps on the same document. Moreover, time-stamping services are typically not scalable to a large number of documents. The current techniques provide a cost-effective and scalable mechanism to establish the integrity and creation time of electronic documents. Examples of documents to which these techniques maybe beneficial include those whose retention may be mandated by governmental or state regulation (e.g., email, business records, financial transactions).

The current techniques enable a rigorous security definition for time-stamping schemes that offers document authenticity against a powerful inside attacker. The current techniques provide scalable methods to authenticate the content and creation time of documents archived for compliance requirements. The current techniques enable time-stamping for archival storage, are scalable to large number of documents (which prevents document back-dating and forward-dating), and enable generation of existence and non-existence proofs for a document at any time interval. The current techniques enable a method, scalable to large number of documents, of locally manipulating a data structure summarizing the document repository. The current techniques are resilient to inside attackers.

In an embodiment of the current techniques, once a document is committed, its existence or non-existence can be established with certainty for any time interval.

In an embodiment, the current techniques enable document verification by providing a proof of a persistent medium at a given period in time. That proof may be used by an auditor in conjunction with a public commitment stored on a public medium to verify that the documents existed at that point in time. The current techniques enable detection of any modifications to documents occurring after they have been archived. The current techniques prevent both back-dating and forward-dating of documents, where typical time-stamping services only prevent back-dating. This is because conventional time stamping services enable only existence proofs, and the current techniques, with the append-only data structure, allow for both existence proofs and non-existence proofs.

Figure 2:
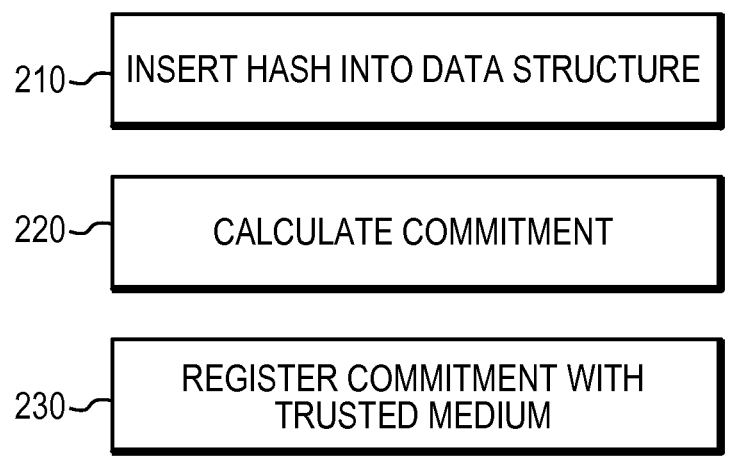
FIG. 2 shows an embodiment of an apparatus of the current techniques including a data structure, an auditor, and a trusted medium.

In an embodiment of the current techniques of FIG. 1 and FIG. 2, there is a local server 120, a data structure 110, and a trusted medium 130. A set of users or employees in an organization may generate documents that are archived for retention in archival storage. A unique hash, such as hash 150, may be created for each document retained and stored in a leaf of the data structure 110. The hash may be computed with a cryptographically secure hash function, such as SHA-1, SHA-256 or the like. A reference to SHA-1 may be the NIST standard.

The hash 150 may be inserted 210 into the local data structure 110, which may contain all the hashes of the archived documents. The server 120 may commit its internal state of the data structure 110, periodically by registering 230 a short commitment 140, with an external trusted medium 130. The public commitment 140 may be a function 220 of all the hashes in the trusted medium 130. In this way the current techniques enable compact proofs to be provided to a third party, such as auditor 160, to verify existence or non-existence of a particular document at any moment in time. The hash value stored in the root of the tree may be committed to a trusted medium periodically. Since this hash may be of relatively small size, in comparison to the documents or the tree itself, it can be e-mail or published in a trusted medium. For example, the hash of the tree is small enough to be published on a publicly available web site similar to publishing information in a newspaper.

Figure 3:
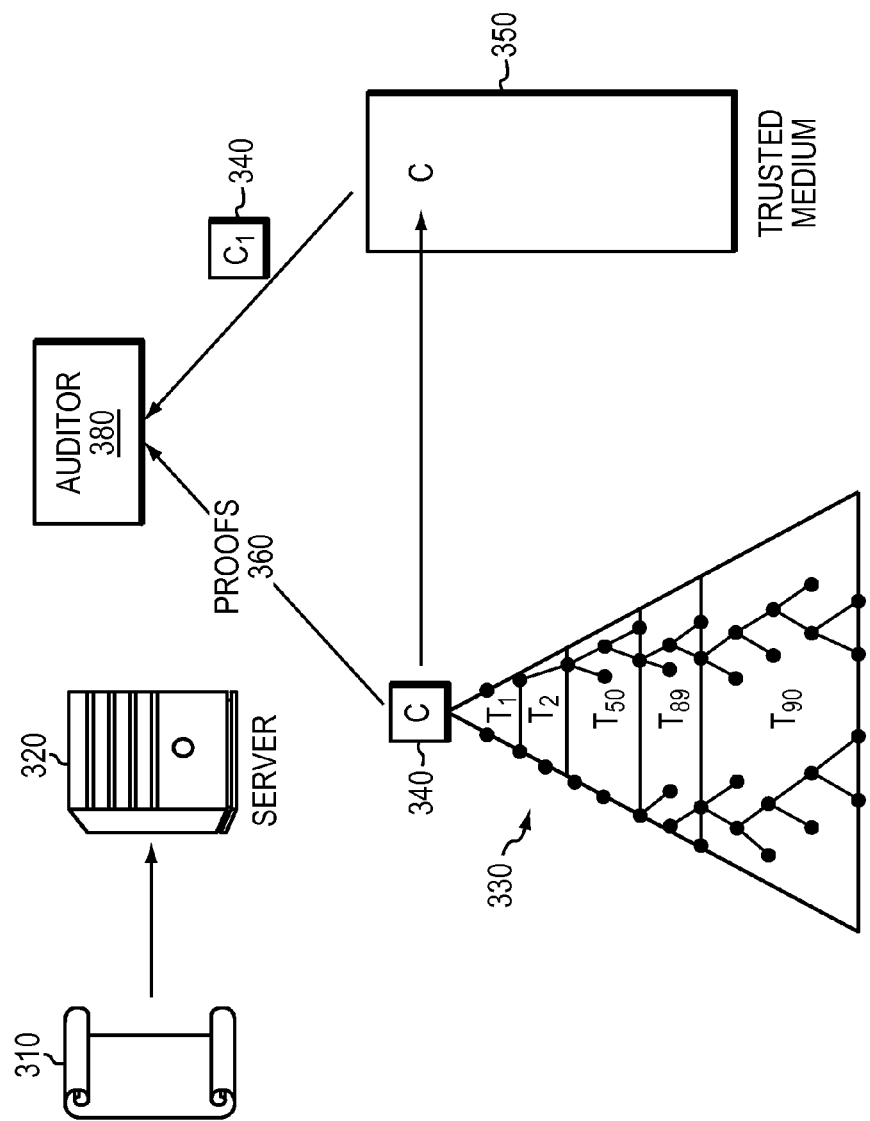
FIG. 3 shows an alternative embodiment of a method of current techniques for committing a commitment.
Figure 4:
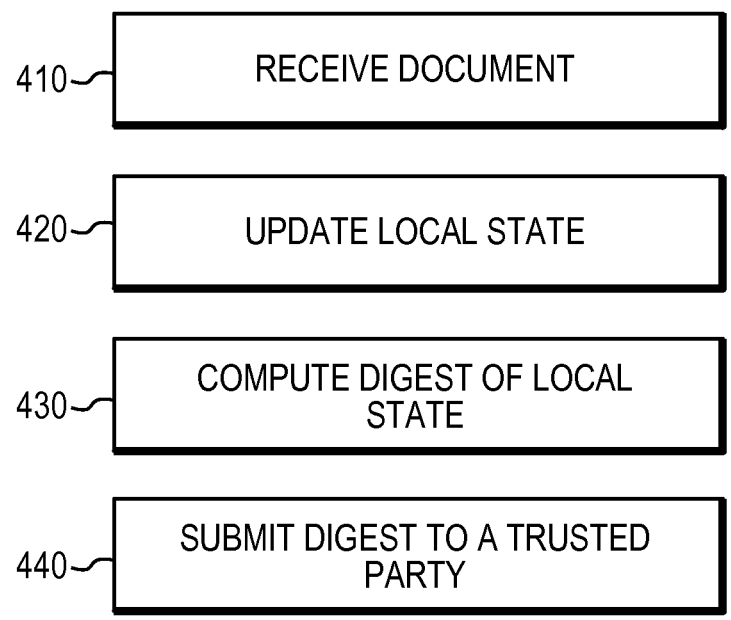
FIG. 4 shows an alternative embodiment of a method of the current techniques for committing a digest to a trusted medium.

In an alternative embodiment of FIG. 3 and FIG. 4, documents, such as document 310, may be received 410 at and retained by a local server 320. Server 320 may maintain locally a state 330 which is updated 420 as new documents are generated and reflects the full state of the document repository. Periodically, Server 320 may compute 430 a short digest or hash 340 from its local state 330 and submit 440 the digest 340 to an external trusted party 350.

Figure 5:
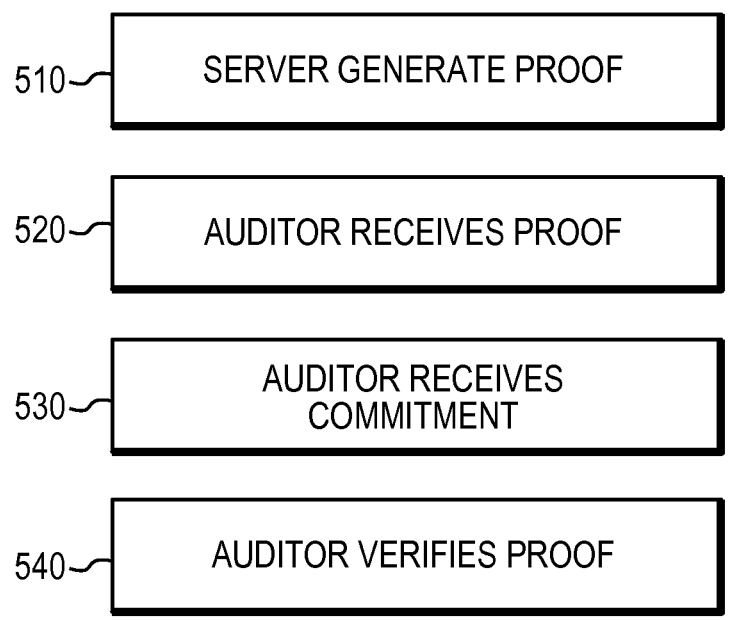
FIG. 5 shows an embodiment of a method of current techniques for verifying a proof.

The trusted party 350 mainly may act as a reliable storage medium for commitments generated by Server 330. With access to the commitments 340 provided by trusted party 350 and proofs 360 generated by server 330, a third party, such as auditor 380, may verify the authenticity and exact creation time of documents. In an embodiment, the external party 350 used to store the periodic commitments may itself be an auditor, but in an alternative embodiment, the auditor role may performed by another party. Referring to FIG. 5, server 330 may generate a proof 510. Auditor 380 may receive the proof 360 and a commitment 340 from the trusted party 350. Auditor 380 may then verify the proof 360 which may correspond to verification of existence or non-existence of a document at a given time.

In an embodiment, the current techniques may operate in time intervals or rounds representing, for example, predetermined numbers of documents. The server may maintain locally a persistent, append-only data structure, updated at the end of a round or time period. The server may commit to the batch of documents created in a round by sending a commitment to the trusted medium. Documents may be addressed by a fixed-size name or handle, which may be implemented by a secure hash of the document (e.g., if SHA-256 is used for creating handles, then their sizes will be 32 bytes).

To enable the efficient creation of both existence and non-existence proofs, the current techniques may use a data structure that minimizes the amount of local storage and the size of commitments. The data structure may support fast insertion of documents, fast document search and may be used to generate compact proofs of membership and non-membership, e.g. existence and non-existence. The data structure may implement an append-only, persistent, authenticated dictionary (PAD). The current techniques may reduce total amount of storage necessary to maintain all versions of the data structure in time, as well as the cost of non-membership proofs compared to previous approaches.

Terminology

The following terminology may be useful in understanding an embodiment of the current invention. An authenticated dictionary (AD) is a data structure that supports efficient insertion, search and deletion of elements, as well as proofs of membership and non-membership with short commitments. ADs may be based on hash trees. Persistent authenticated dictionaries (PAD) are ADs that maintain all versions in time and can provide membership and non-membership proofs for any time interval in the past.

A Merkle tree is a binary tree with a leaf for each value, and a hash value stored at each node. The hash for the leaf corresponding to value v is h(v). The hash for an internal node with children v and w is computed as h(v||w). The Merkle tree can also create a commitment, or "proof" of the values stored in the tree. The commitment for the entire set or tree is the hash value stored in the root of the tree and the generated commitment may be a constant-size for any set of values. Given the commitment to the set, a proof that a value is in the set includes all the siblings of the nodes on the path from the root to the leaf that stores that value. Merkle trees can be generalized to trees of arbitrary degree.

A trie is a tree indexed by document handles. Trie data structures are organized as trees, with branching performed on key values. Consider a binary trie in which each node is labeled by a string as follows. The root is labeled by the empty string λ, a left child of node u is label by u0 and a right child of node u is labeled by u1. When a new string is inserted in the trie, its position is uniquely determined by its value. The trie is traversed starting from the root and following the left path if the first bit of the string is 0, and the right path, otherwise. The process is repeated until all bits of the string are exhausted. When traversing the trie, new nodes are created if they do not already exist. Siblings of all these nodes with a special value null are also created, if they do not exist.

Figure 6:
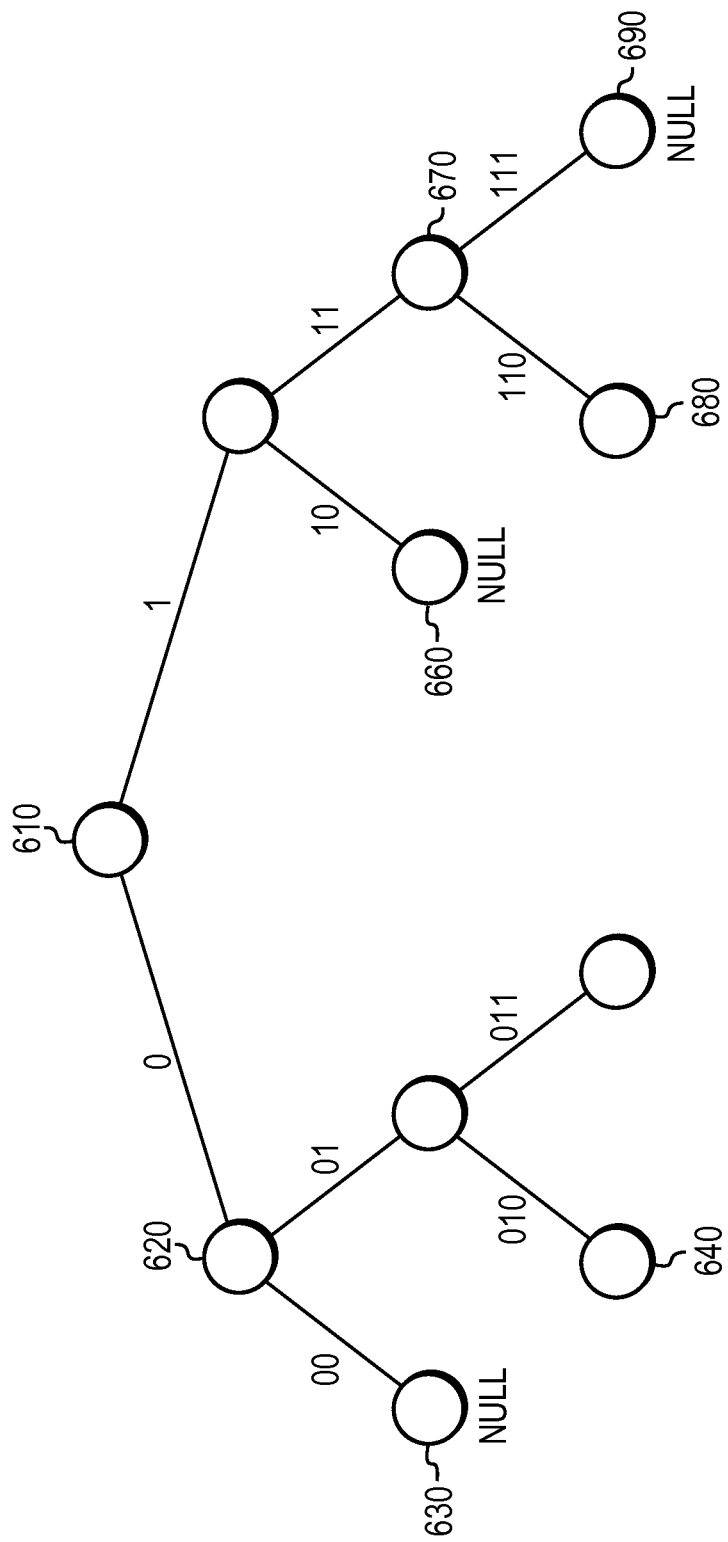
FIG. 6 shows an embodiment of a data structure of the current techniques.

FIG. 6 shows an example of a trie 600 containing strings 010, 011 and 110. The root 610 of trie 600 shows how the trie branches according to 0 or one of the string to be inserted. As this trie 600 is not optimized, several nulls such as nodes 630 and 660 exist. Nodes 640, 690, and 680 show the respective strings 010, 011, and 110.

A Patricia tree is an optimized trie, also indexed by document handles. A Patricia tree may be optimized using a technique called path compression. With path compression, a skip value may be stored at each node that includes a 0 (or 1) for each left (or right, respectively) edge that is skipped in the optimized tree. The optimized tree then does not contain any null values.

Figure 7:
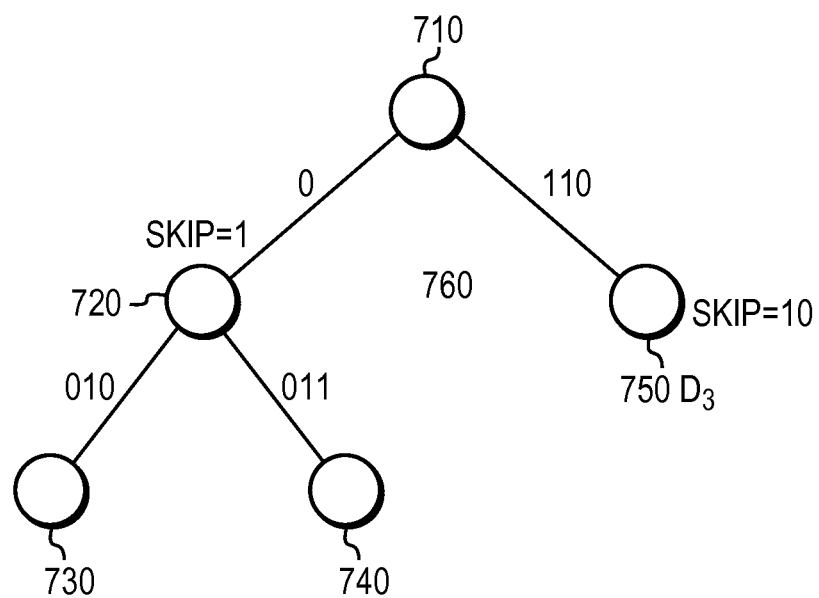
FIG. 7 shows an alternative embodiment of a data structure of the current techniques.

FIG. 7 illustrates a data structure storing the same data as shown in FIG. 6, however note that this tree is optimized to remove the null nodes within the tree. This enables quicker search of the tree for existing and non-existent documents. In FIG. 7, Patricia tree 710 contains 5 nodes, none of which represent null nodes. Nodes 730, 740, and 750, which are the only leaves, represent the respective strings 010, 011, and 110. Also, 720 and 760 denote where "skips" occur in the optimized tree, which would represent null nodes in a tree that was not optimized.

Example Embodiment

In a particular embodiment, the data structure of the current techniques may layer a Merkle tree over a trie or Patricia tree. This data structure may also be considered a type of PAD and may allow for append only functionality, not allowing deletions. Layering of the Merkle tree over the trie or Patricia tree may be done by computing hashes for internal nodes using the hash values of children. The tree may be indexed by document handles.

As document hashes are added to the tree, the commitment for each round may be the value stored in the root of the tree. At each time interval, the hashes of internal nodes might change as new nodes are inserted into the tree. In order to generate membership and non-membership proofs at any time interval, it may be necessary to maintain all versions of node hashes. In addition, it may be necessary to enumerate all documents generated at time T. The commitment or verification for each round or each document commitment may be the value stored in the root of the tree. At each time interval, the hashes of internal nodes might change as new nodes are inserted into the tree. In the data structure each node in the tree stores a list of hashes (computed similarly to Merkle trees) for all time intervals the hash of the node has been modified. The list of hashes is ordered by time intervals.

To speed the creation of existence and non-existence proofs in the past time periods, the current techniques enable some additional values to be stored in each node. Specifically, each node u maintains a list of records L u, ordered by time intervals. L u contains one record v u for each time interval t in which the hash value for that node changed. v u.hash is the hash value for the node at time t, v u.lpos is the index of the record at time t for its left child in Lu0, and v u.rpos is the index of the record at time t for its right child in Lu1. If one of the children of node u does not contain a record at time t, then v u.lpos or v u.rpos store the index of the largest time interval smaller than t for which a record is stored in that child.

By storing these additional values, the subtree of the current tree for any previous time interval t may be easily extracted traversing the tree from the root and following at each node v the lpos and rpos pointers from record v u. The cost of generating existence and non-existence proofs at any time in the past is then proportional to the tree height, and does not depend on the number of time intervals. In addition, all documents generated at a time interval t may be determined by traversing the tree in pre-order and pruning all branches that do not have records created at time t.

Insertion into a Non-Optimized Data Structure

Figure 8:
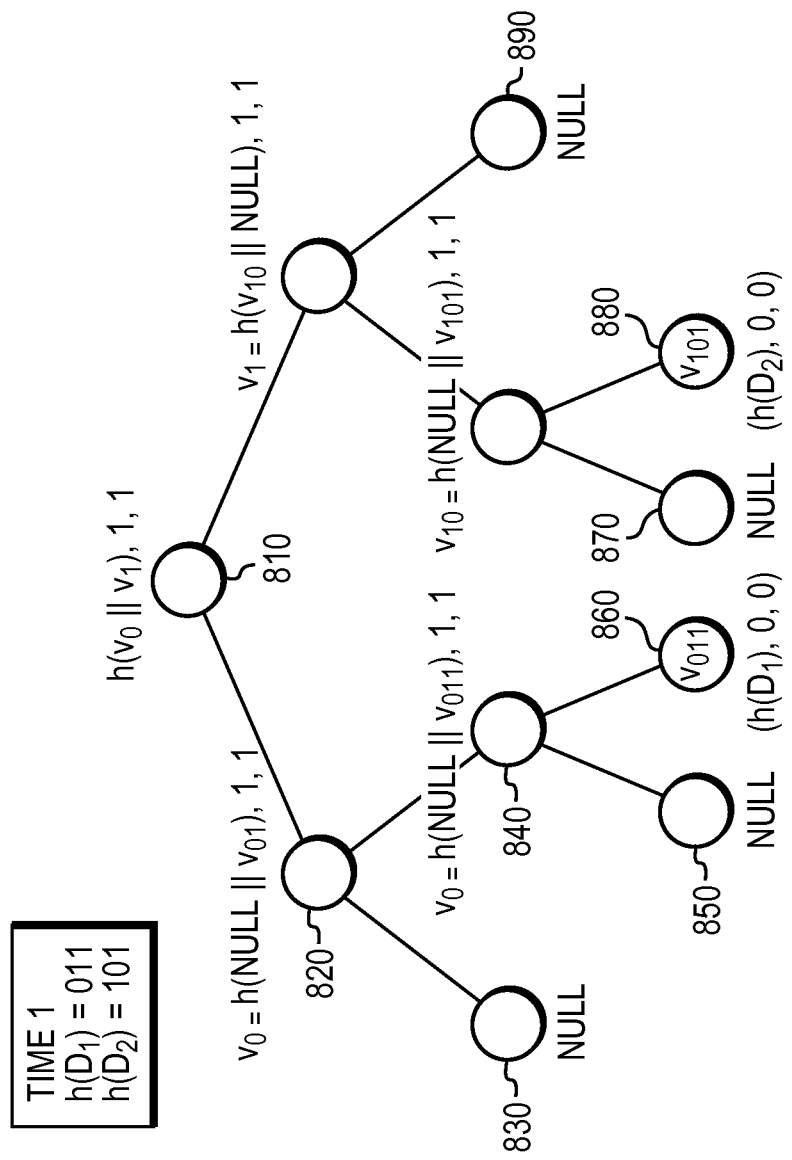
FIG. 8 shows an alternative embodiment of a data structure of the current techniques at a time T=1.
Figure 9:
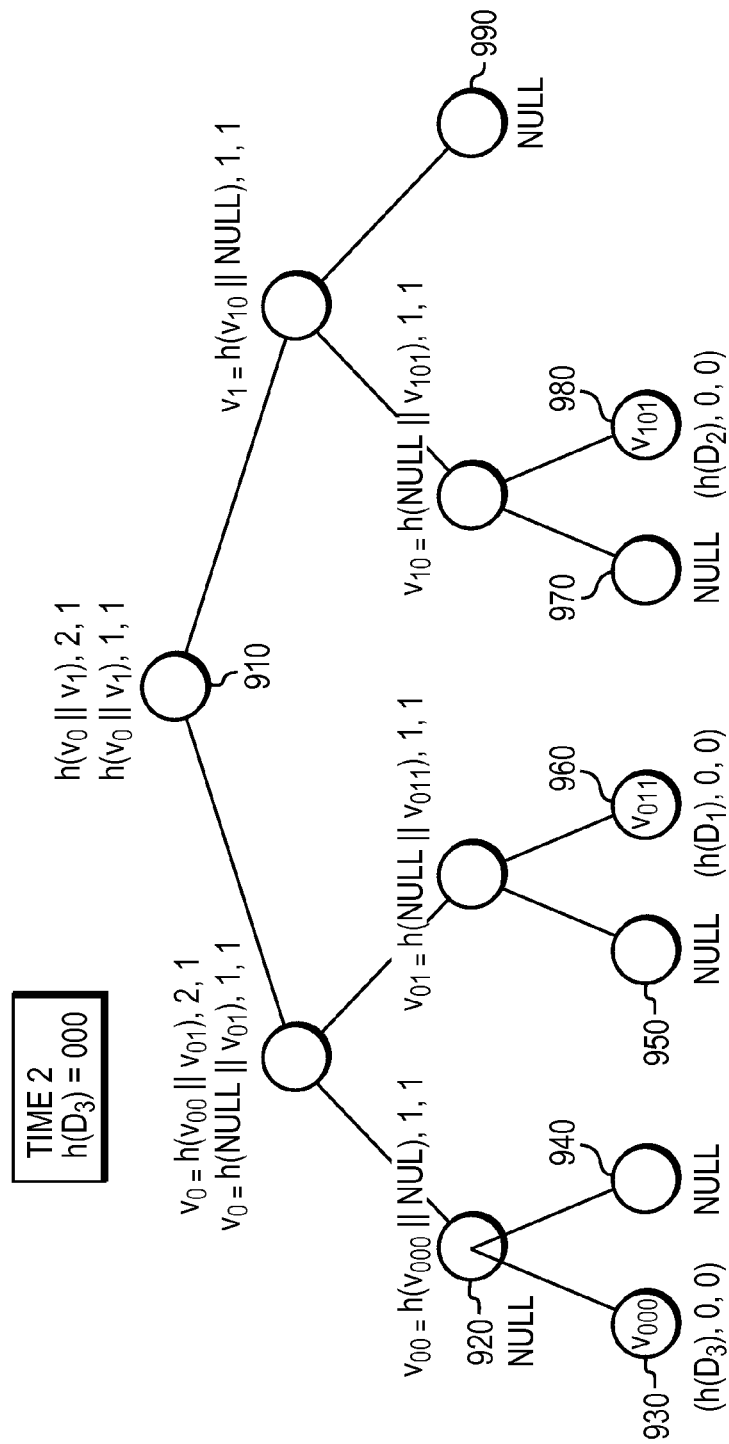
FIG. 9 shows an alternative embodiment of a data structure of the current techniques at a time T=2.
Figure 10:
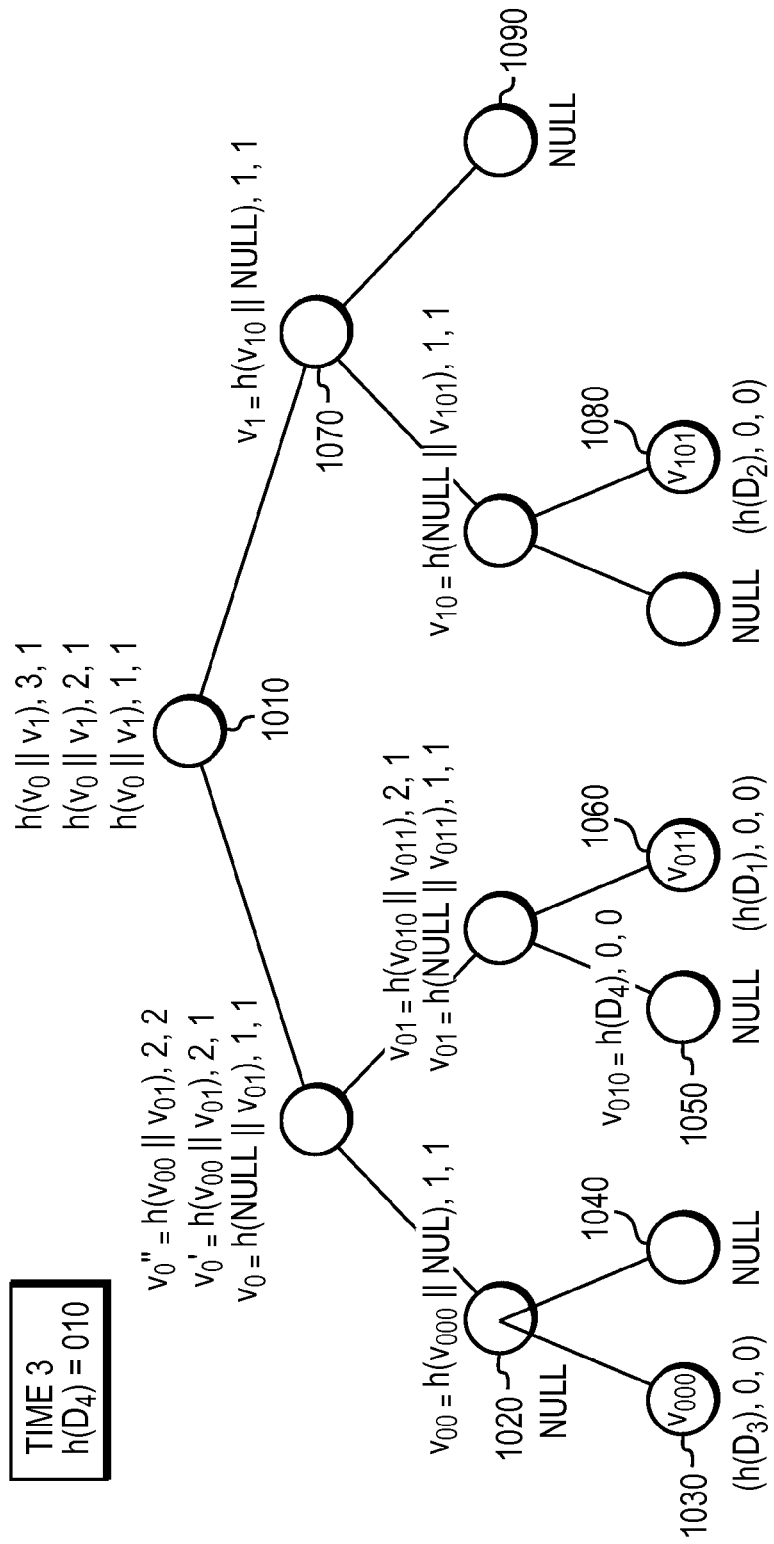
FIG. 10 shows an alternative embodiment of a data structure of the current techniques at a time T=3.

FIGS. 8, 9, and 10 provide an example of insertion of document hashes into an un-optimized tree at time T=1, T=2 and T=3 according to the current techniques. Referring to FIG. 8, at time T=1, trie 800 has four null nodes, 830, 850, 870, and 890. Trie 800 has had two strings, 011 and 101 inserted into the tree and are represented by Nodes 860 and 880, respectively. Each Node, 810-890, has a value associated with it. For example, Node 890 is Null, while its parent node is represented as h(v10||Null),1,1. As well, the root of the tree is shown as h(v0||v1),1,1.

Referring to FIG. 9, trie 900 represents trie 800 of FIG. 8 at time T=2, where String 000 has been inserted into trie 800 to arrive at trie 900. Each node of trie 900 tracks not only the current value of each node, 910-990, but also the previous value of the node. For example, node 910, the root of the trie, has two values associated with it, the value at t=1 and the value at t=2, h(v0||v1),1,1 and h(v0||v1),2,1, respectively. This allows trie 900 to track the current state of the tree as well as to calculate the previous state of the tree. Again, in this trie there are null values for nodes, such as nodes 940, 950, 970, and 990. Node 940, a null node, did not exist at time t=1, so there is only one value at this node. Nodes 930 and 940 were added when string 000, corresponding to node 930, was added to this trie.

Referring now to FIG. 10, the trie 1000 represents the trie of FIG. 9 at time t=3, where String 010 has been inserted into trie 900 to arrive at trie 1000. As in FIG. 9, each node 1010-1090 has been updated to contain a value for the time at T=3. As in FIG. 8, some nodes, such as node 1060 contain only one value, as they only existed in the current time period or, such as node 1070, have had the same value since T=1.

Insertion into an Optimized Data Structure

Consider now, an embodiment of the data structure of the current techniques applying an optimized tree as the data structure. To construct a time-stamping scheme for archival storage, the local server may need to maintain a persistent data structure that supports insertions of new documents, enables generation of proofs of membership and non-membership of documents for any time interval, and has short commitments per interval. The current techniques enable efficient search by document handle, and also enumeration of all documents that have been generated in a particular time interval.

Figure 11:
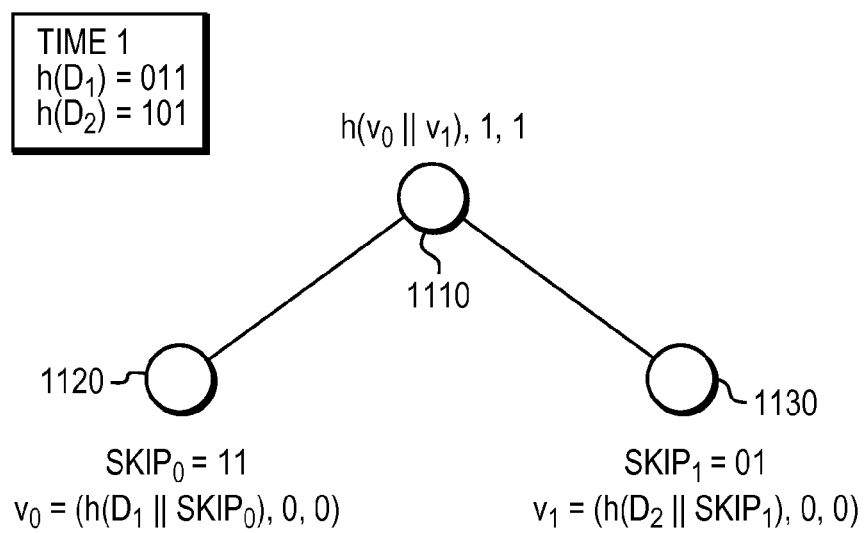
FIG. 11 shows an optimized alternative embodiment of a data structure of the current techniques at a time T=1.

Refer now to FIG. 11, which represents an embodiment of an optimized trie containing strings 011 and 101 at time T=1. This optimized trie has three nodes, a root node 1110 and two child nodes 1120 and 1130. This optimized tree may be contrasted to the trie of FIG. 8. This optimized trie 1100 is able to represent in 3 nodes what trie 800 represented in 11 nodes. This enables quicker insertion and searching in trie 1100 than would be possible in trie 800. As well, in the optimized version of the data structure, skip values may be included when computing node hashes and may be included in the commitment.

Figure 12:
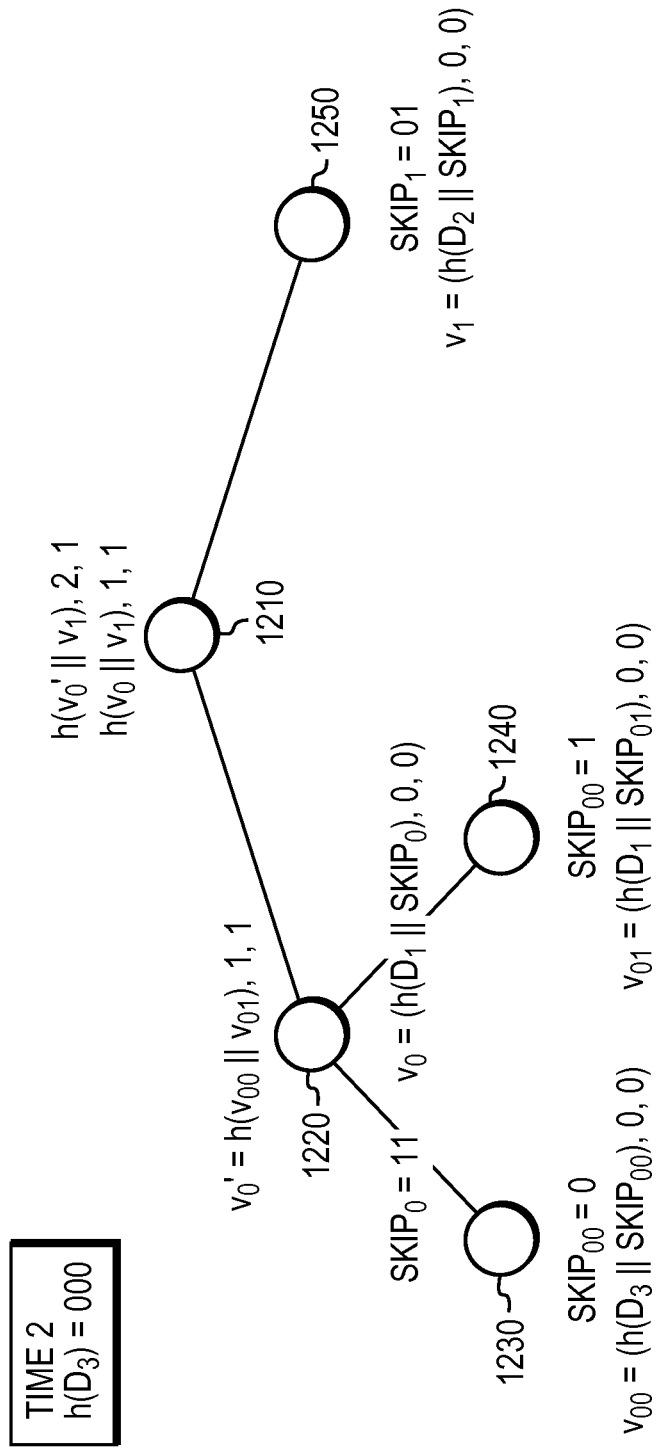
FIG. 12 shows an optimized alternative embodiment of a data structure of the current techniques at a time T=2.
Figure 13:
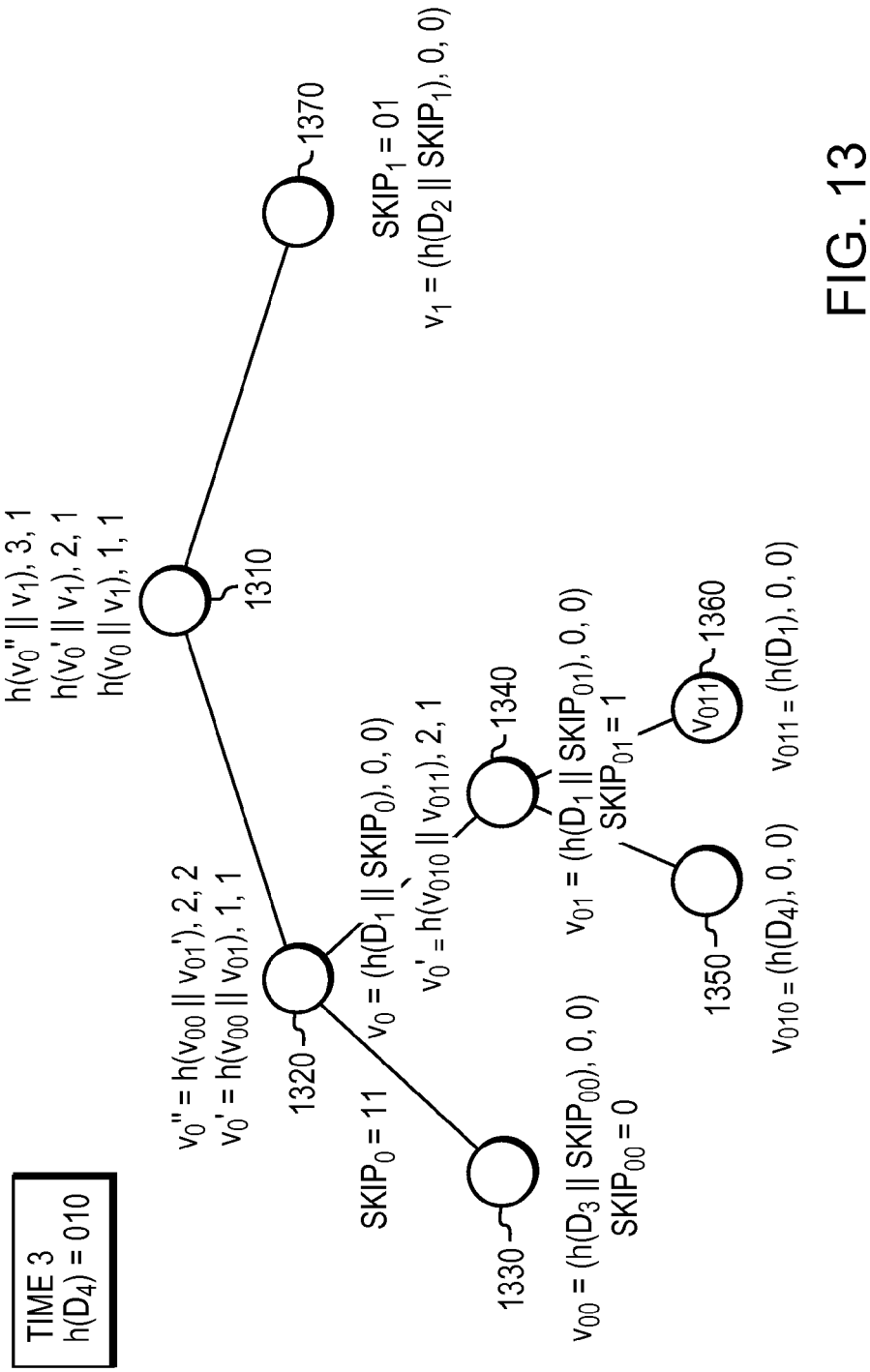
FIG. 13 shows an optimized alternative embodiment of a data structure of the current techniques at a time T=3.

Refer now to FIG. 12, which represents trie 1100 at time T=2 after string 000 has been inserted to create trie 1200. In this trie, there are 3 end nodes, 1230, 1240, and 1250 which correspond to the three strings entered into the trie, 000, 010, and 101. This represents an optimized trie of FIG. 12. Finally, refer now to FIG. 13, which represents trie 1200 at time T=3 after string 010 has been inserted to created trie 1300. In this three there are 4 end nodes, 1330, 1350, 1360, and 1370, which correspond to the four inserted strings, 000, 010, 011, and 101, respectively. Each node has a value for each time period for which the node existed. For example, root node 1310 has three values, where node 1370 has one constant value for all three times and Node 1320 has two values, as it only has existed for 2 time steps.

Commitment to a Trusted Medium

Figure 14:
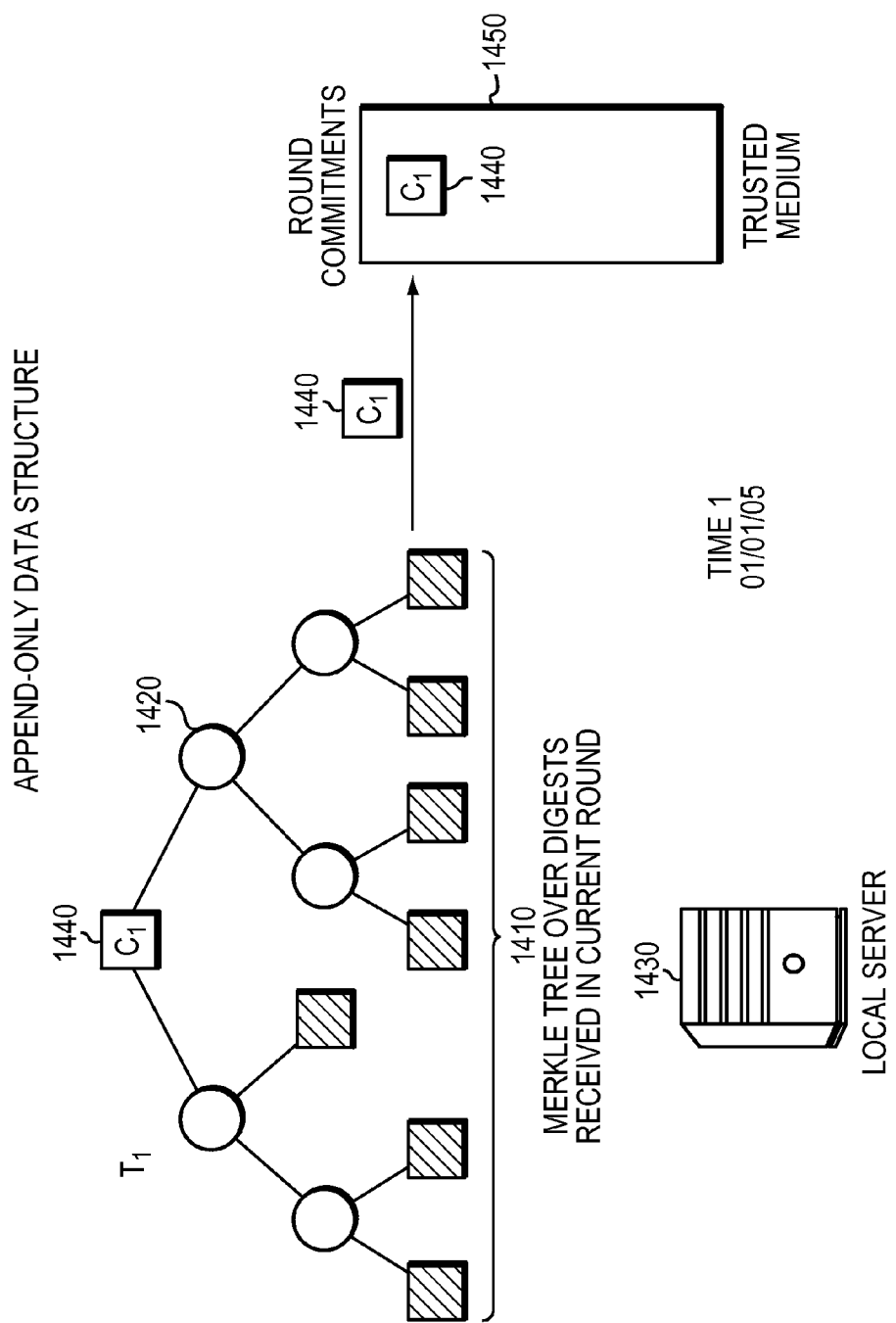
FIG. 14 shows an embodiment of a system at a time T=1 on which the current techniques may be practiced.
Figure 15:
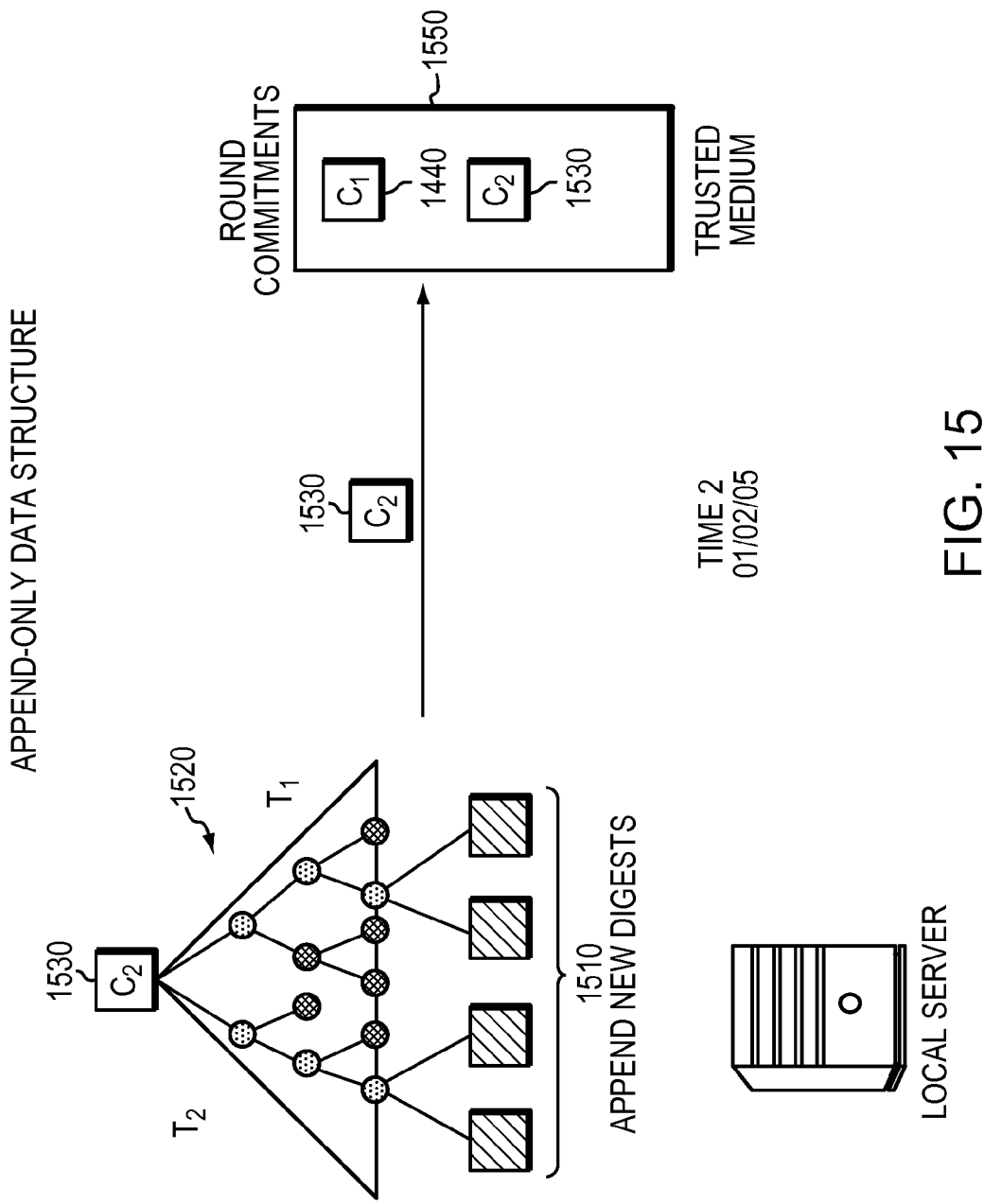
FIG. 15 shows an embodiment of a system at a time T=2 on which the current techniques may be practiced.
Figure 16:
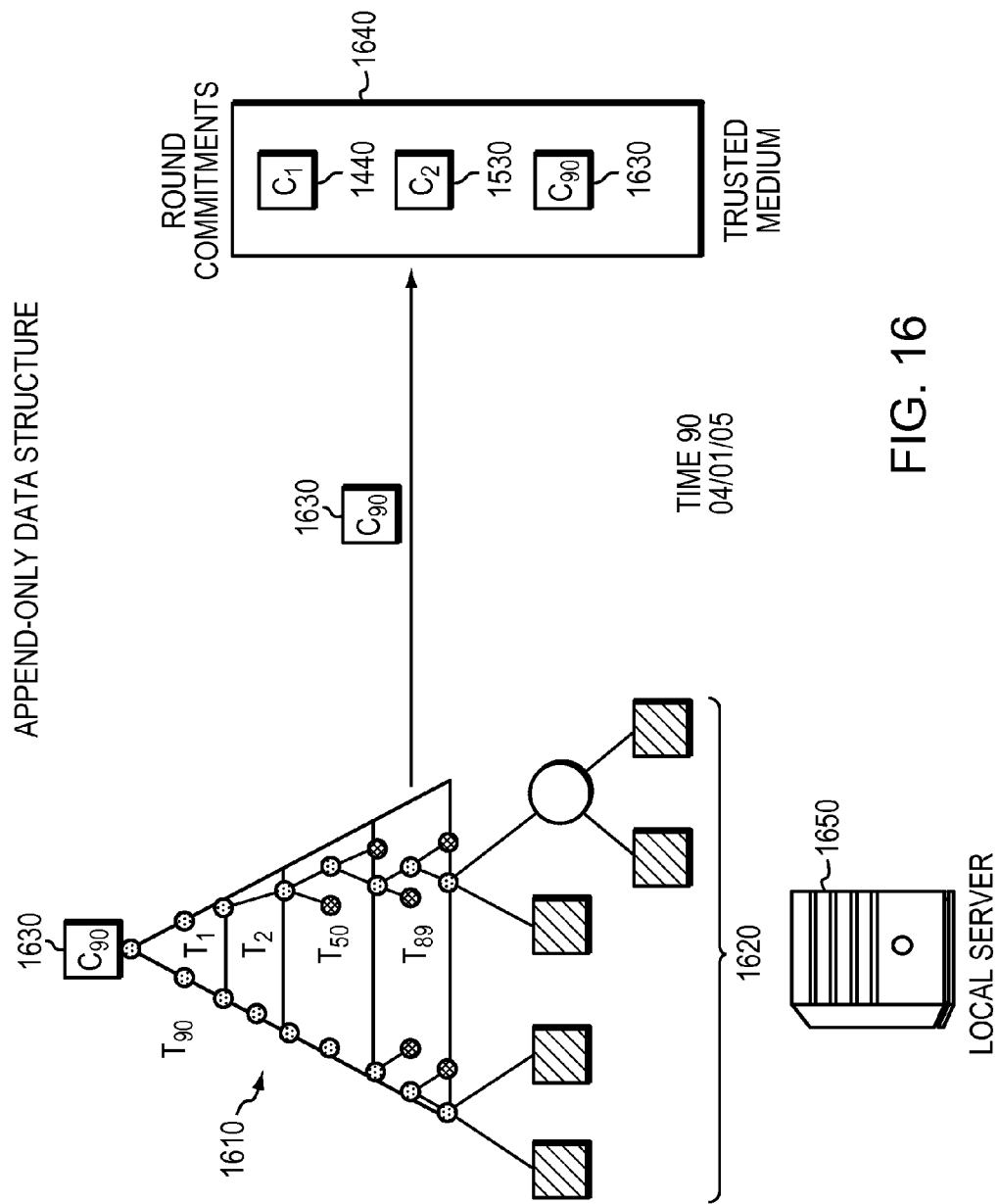
FIG. 16 shows an embodiment of a system at a time T=90 on which the current techniques may be practiced.

Refer now to FIGS. 14-16 which represent a sample embodiment of documents being stored in the data structure and a commitment being stored with a trusted medium. A commitment for a time interval is a hash of the current time interval and the hash value stored in the root of the tree. In FIG. 14, values 1410 represent the hashes of documents and are inserted into data structure 1420 in the current round at time T=1. The data structure 1420 is stored on local server 1430. After insertion of the documents, a commitment $C_1$, 1440, is calculated. C1 may be a hash of the time interval (1 in this case) and the value may be stored in the root of the tree. C1, 1440, is then sent to the Trusted Medium 1450.

Referring now to FIG. 15, values 1510 have been inserted into data structure 1420 to create data structure 1520. Data structure 1520 consists of values in the tree at time T=1 and values inserted at the time T=2. A commitment 1530 is generated and sent to trusted medium 1540, which stores the commitment 1530. Note that the value of the trie at T=2 may have changed from the trie of FIG. 14 at T=1 as additional hash values may be inserted into the trie at time T=2 of FIG. 15. Note that the if no new documents are inserted into the trie, the commitment for different times may also be different. This could be because the time of construction of the commitment is used to create the commitment.

FIG. 16 illustrates an embodiment of the invention at time T=90. As shown in data structure 1610, different commitments of values have been performed, such as at T1, T2, T50, and T 89. New values 1620 have been inserted into the data structure 1610. For time T=90, a commitment 1630 has been generated and the commitment is being sent to the trusted medium 1640.

Verification of Existence and Non Existence

To prove a document's existence at time t, the server may provide evidence that the document handle was included in the tree at its correct position at time t. Similarly to Merkle trees, the server may provide the siblings of the nodes on the path from the leaf to the root and the auditor may compute the root hash value and checks it is equal to the commitment at time t. In addition, the proof may include the skip Values for the nodes on the path from the leaf to the root of the tree.

A document's non-existence at time t needs to demonstrate (for the trie version) that one of the nodes on the path from the root of the tree to that document's position in the tree has value null. For the optimized Patricia tree version, non-existence proofs demonstrate that the search path for the document starting from the root either stops at a leaf node with a different handle, or encounters an internal node with both children's labels non-prefixes of the document handle.

Figure 17:
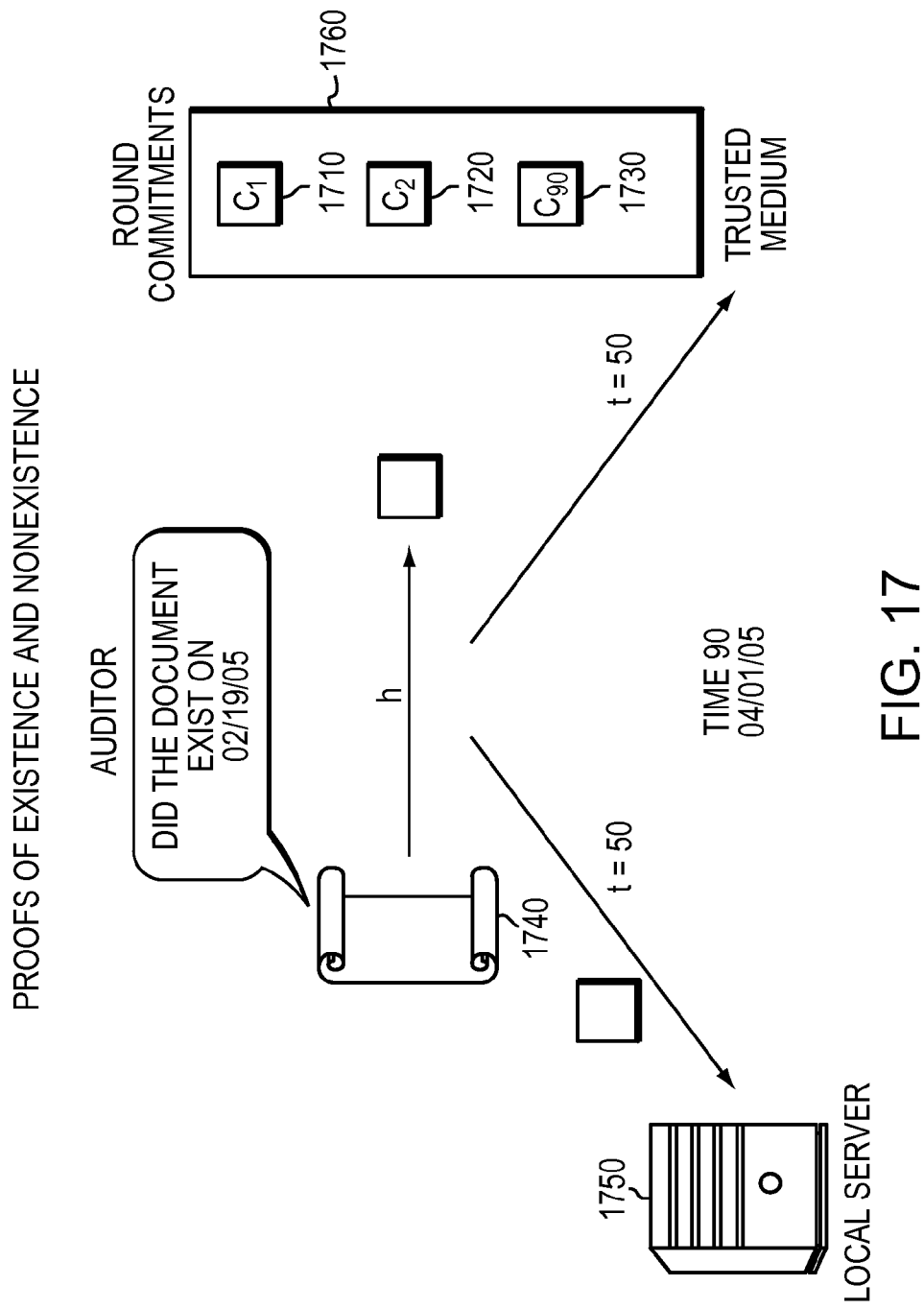
FIG. 17 shows an embodiment of a system of the current techniques that may be used to verify the existence or non-existence of a document.

In the exemplary embodiment of FIG. 17, hashes C1 1710, C2 1720 . . . C90 1730 have been committed to the trusted medium. Say, for example, it is desired to verify whether document 1740 existed at time T=50. This request may correspond to requesting a proof from the local server 1750 and a commitment, e.g. C50, from the trusted medium 1760.

Figure 18:
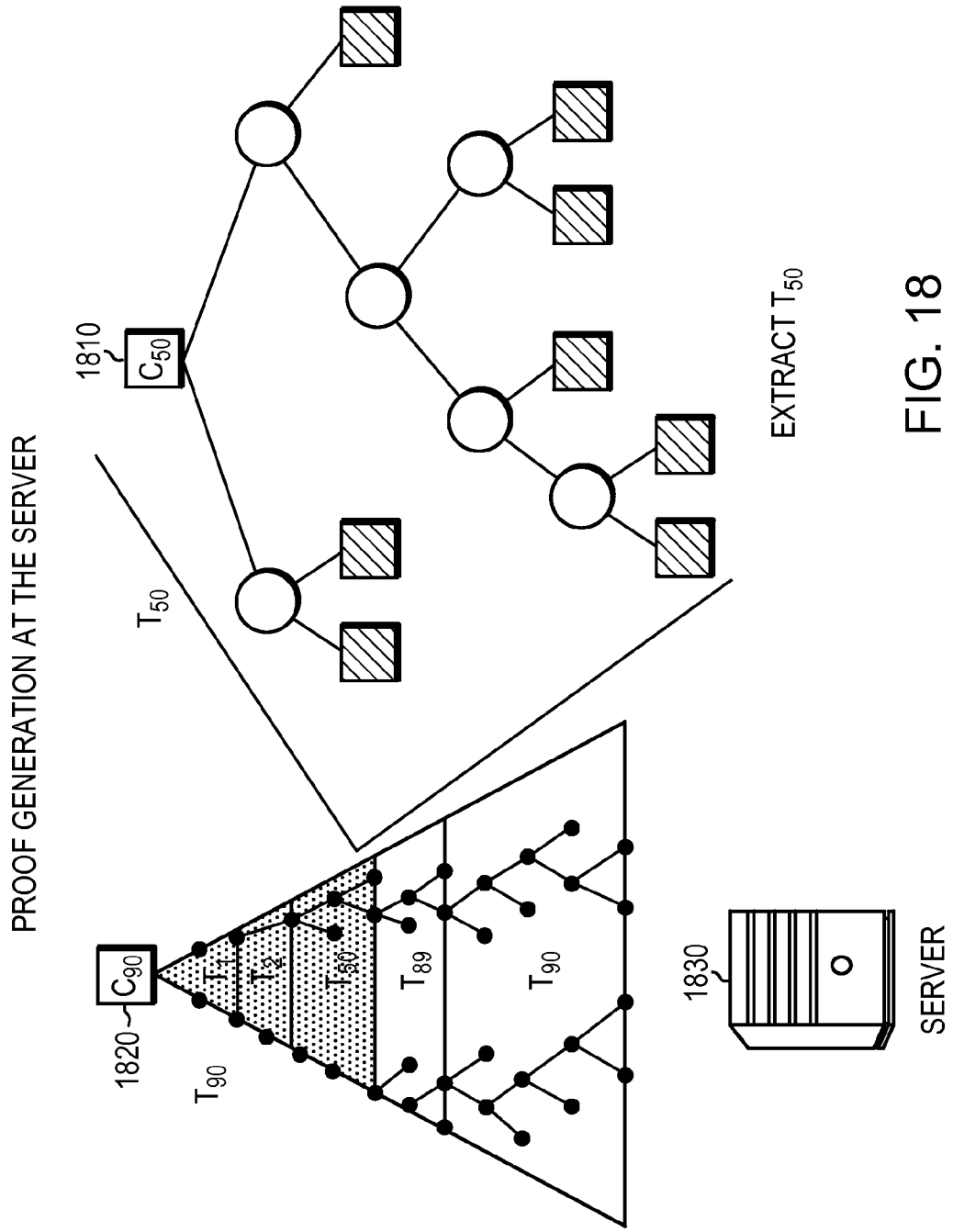
FIG. 18 shows an embodiment of a system of the current techniques that may be used to verify the existence or non-existence of a document at time T=50.
Figure 19:
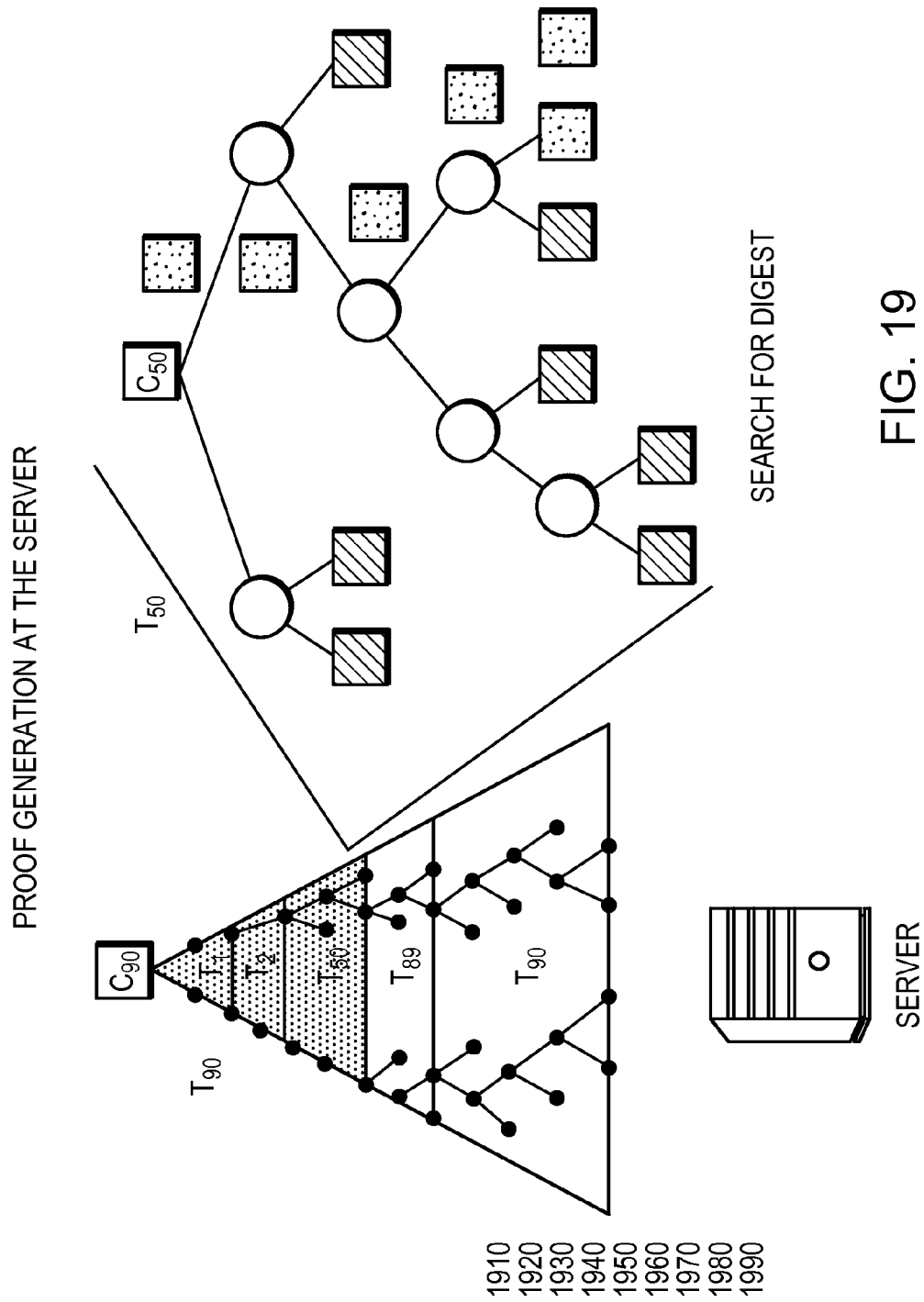
FIG. 19 shows an embodiment of a system according to the current techniques that may be used to verify the existence or non-existence of a document at time T=50.
Figure 20:
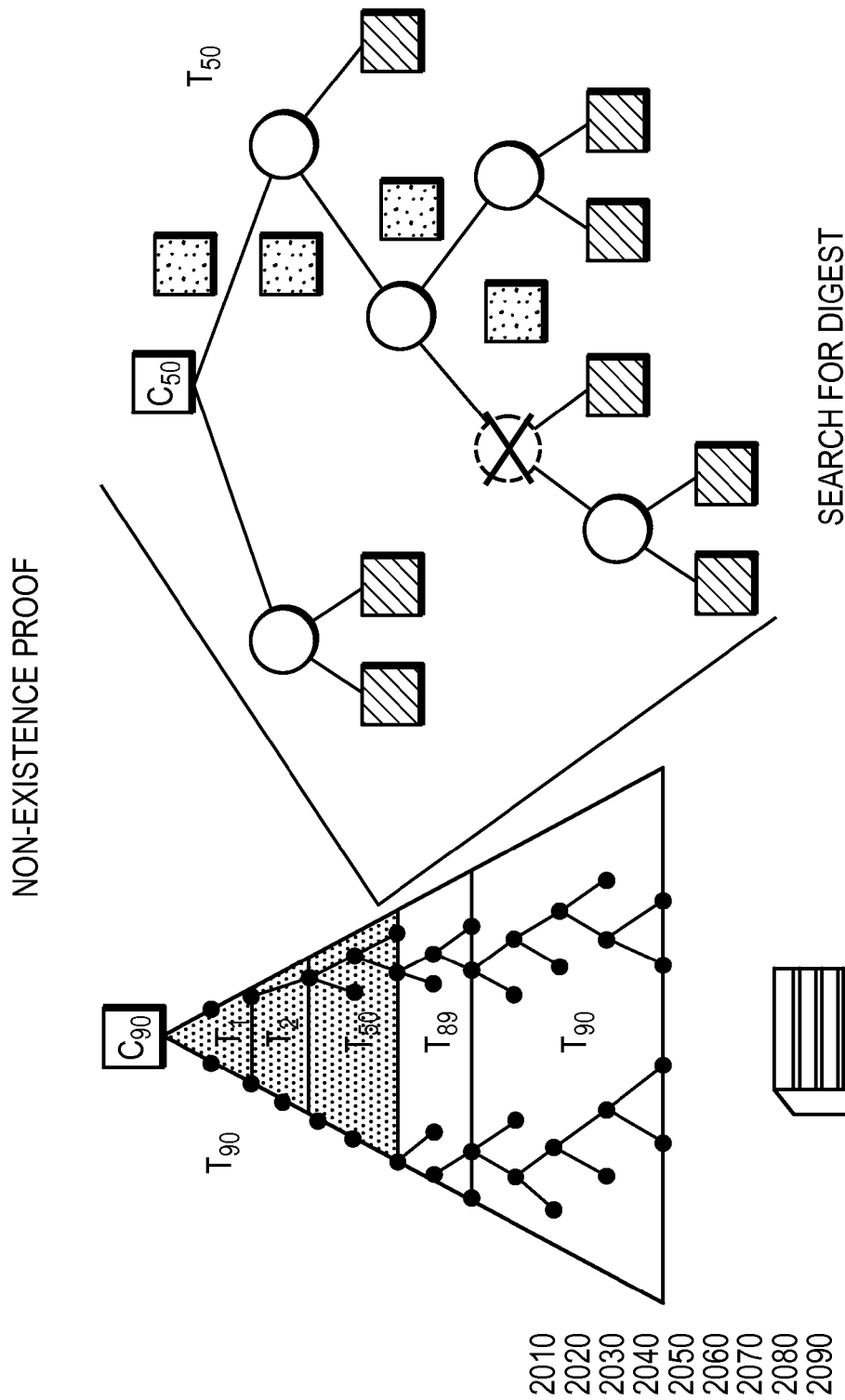
FIG. 20 shows an embodiment of a system of the current techniques that may be used to verify the existence or non-existence of a document at time T=50.

FIG. 18 illustrates an example tree 1810, stored within the overall data structure 1820 stored on the Server 1830. The tree 1810 represents the values that had been committed to the data structure 1820 at time T=50. It is with this tree 1810 that local server 1830 will generate a proof. In FIG. 19, the hash is searched by descending into the tree until a leaf is encountered, and it is found it existed in the tree. Conversely, referring to FIG. 20, it is shown that the particular value did not exist at time T=50. The search path in this case (for non-existing documents) might end at internal node in the tree.

Figure 21:
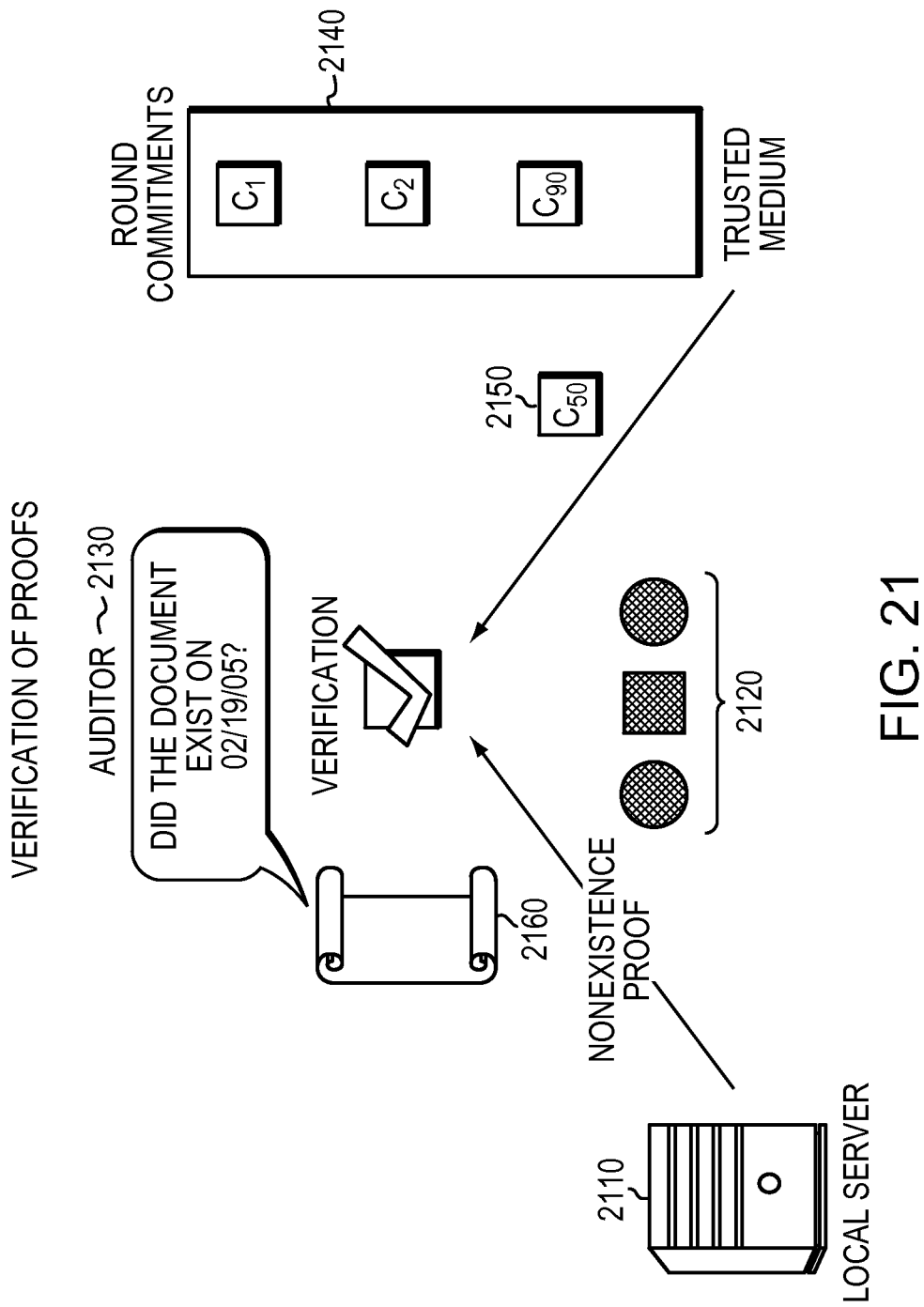
FIG. 21 shows verification of a proof according to an embodiment of the current techniques.
Figure 22:
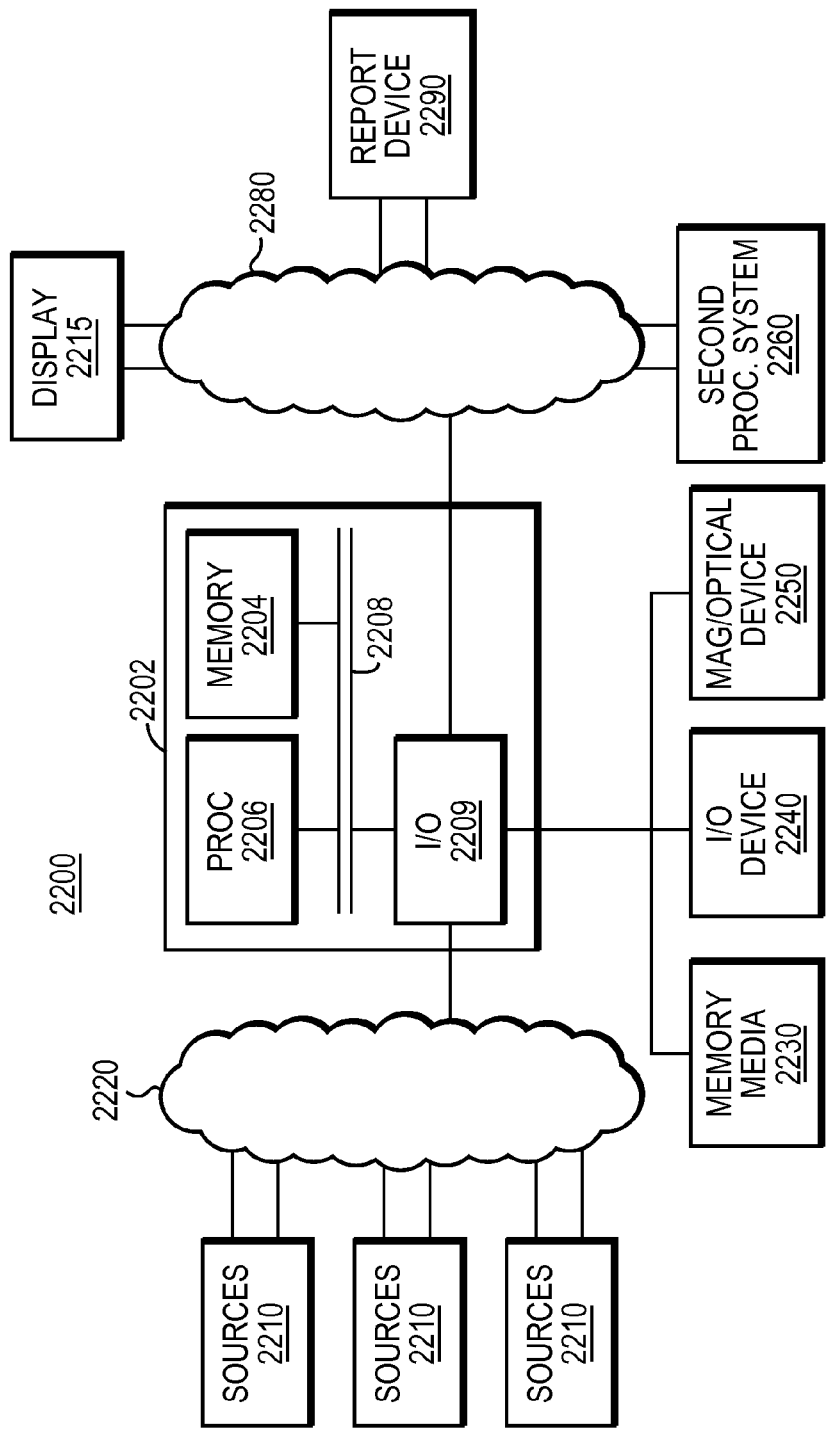
FIG. 22 shows an embodiment of the current techniques stored as program logic on a computer readable storage medium.

In FIG. 21, server 2110 has generated a proof 2120 and submitted the proof 2120 to auditor 2130. As well, trusted medium 2140 has submitted a commitment 2150 for time T=50 to auditor 2130. The auditor 2130 may use the proof of existence or non-existence and the commitment to verify existence or non-existence of the document 2160.

Take for example the generation of an existence proof. To generate a proof, the server may need to search the digest of the document. A search path may contain the nodes from the root of the tree extending to the leaf containing the digest. The proof may contain the hashes of the sibling nodes from the search path and the skip values of the nodes on the search path. To verify an existence proof, the auditor may recompute the hashes of the nodes on the search path from the leaf containing the digest up to the root of the tree. This may be done with the sibling and skip values contained in the existence proof. The server may compare the value at the root of the tree with the commitment received from the auditor. If they match, it accepts the proof. A non-existence proof is performed in a similar manner with the difference that the search could stop at an internal node in the tree search whereas for existence proof it always stops at a leaf node.

In an alternative embodiment, there may be a data structure. The data structure may store document values, such as hashes of documents. The data structure may also generate a commitment. The commitment may represent a function of all the document values within the data structure. The commitments of the data structure may be periodically submitted to a trusted medium. The trusted medium may maintain all the commitments.

Existence or non-existence of a document may be confirmed by an auditor. The auditor may request a commitment at a given time from the trusted medium. The auditor may also request a proof of existence or non-existence from the data structure. Using the commitment and the proof, the auditor can confirm the existence or non-existence of a document at a given time.

Figure 23:
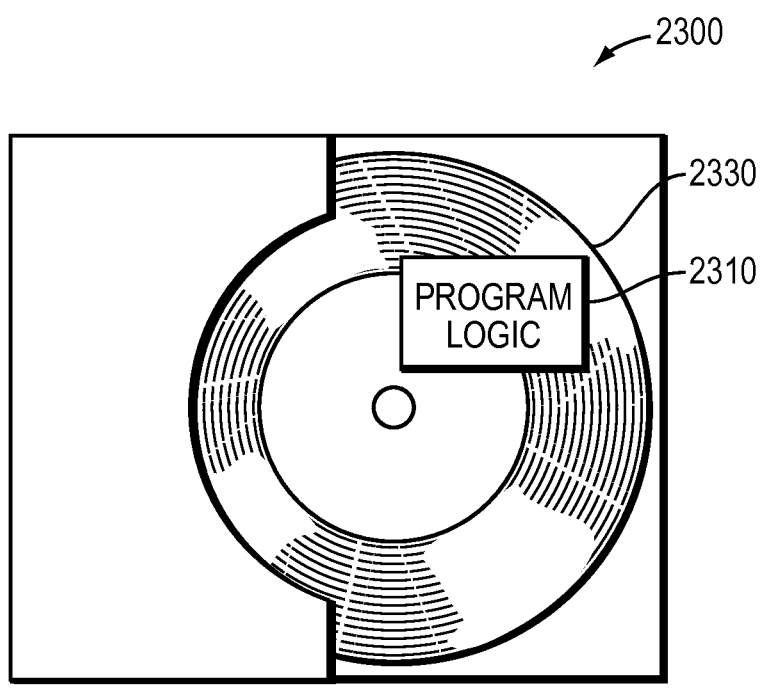
FIG. 23 shows an embodiment of a computer system on which the current techniques may be practiced.

The methods and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as a computer, the machine becomes an apparatus for practicing the invention. When implemented on one or more general-purpose processors, the program code combines with such a processor to provide a unique apparatus that operates analogously to specific logic circuits. As such a general purpose digital machine may be transformed into a special purpose digital machine. FIG. 23 shows Program Logic 2310 embodied on a computer-readable medium 2330 as shown, and wherein the Logic is encoded in computer-executable code configured for carrying out the reservation service process of this invention and thereby forming a Computer Program Product 2300.

The logic for carrying out the method may be embodied as part of the system described below, which is useful for carrying out a method described with reference to embodiments shown in, for example, FIG. 1 and FIG. 2. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A computer system to authenticate documents comprising:
   a computer having a memory;
   computer-executable program code operating in memory, wherein the computer-executable program code is configured for execution of:
   periodically appending a hash representing a document to a data structure, the data structure configured to store one or more hashes; and
   creating a commitment for the data structure at pre-established intervals by creating a digest of the one or more hashes of the data structure, wherein a size of the commitment is constant regardless of the number of hashes in the data structure.

2. The system of claim 1 wherein the pre-established interval is a time T.

3. The system of claim 1 wherein the pre-established interval is a predetermined number of documents appended.

4. The system of claim 1 wherein the system further comprises a trusted medium and the executable program code is further configured for sending the commitment to the trusted medium.

5. A method for verifying the existence of a document comprising: postulating a state of existence of the document; obtaining, from a server, a proof of existence of the document at a time T; obtaining, from a trusted medium, a commitment for time T; and testing the postulate by determining whether there is a pre-established correspondence between the proof obtained from the server and the commitment obtained from the trusted medium; wherein a successful determination establishes the postulate is true and wherein a negative comparison establishes the postulate is false.

6. The method of claim 5 wherein the pre-established correspondence is one equals a mathematical function of the other.

7. The method of claim 5 wherein the server obtains the proof of existence from a data structure, the data structure comprising a trie.

8. The method of claim 7, wherein the data structure is generated by inserting values into the trie according to the hash of the document.

9. The method of claim 5 wherein the proof is generated by searching the data structure for a digest of the document.

10. A program product for verify existence of a document comprising:
    a non-transitory computer-readable storage medium encoded with computer-executable program code enabling:
    computer-executable program code operating in memory, wherein the computer-executable program code is configured for execution of:
    postulating a state of existence of the document;
    obtaining, from a server, a proof of existence of the document at a time T;
    obtaining, from a trusted medium, a commitment for time T; and
    testing the postulate by determining whether there is a pre-established correspondence between the proof obtained from the server and the commitment obtained from the trusted medium; wherein a successful determination establishes the postulate is true and wherein a negative comparison establishes the postulate is false.

11. The program product of claim 10 wherein the pre-established correspondence is one equals a mathematical function of the other.

12. The program product of claim 10 wherein the server obtains the proof of existence from a data structure, the data structure comprising a trie.

13. The program product of claim 11, wherein the data structure is generated by inserting values into the trie according to the hash of the document.

14. The program product of claim 11 wherein the proof is generated by searching the data structure for a digest of the document.

15. A computer system to authenticate documents comprising:
    a computer having a memory;
    computer-executable program code operating in memory, wherein the computer-executable program code is configured for execution of:
    postulating a state of existence of the document;
    obtaining, from a server, a proof of existence of the document at a time T;
    obtaining a commitment for time T; and testing the postulate of the state of existence of the document by determining whether there is a pre-established correspondence between the proof obtained from the server with the commitment; wherein a successful comparison establishes the postulate is true and wherein a negative comparison establishes the postulate is false.

16. The system of claim 15 wherein the system further comprises a trusted medium and wherein the commitment is obtained from the trusted medium.

17. The system of claim 15 wherein the pre-established correspondence is one equals a mathematical function of the other.

18. The system of claim 15 wherein the server obtains the proof of existence from a data structure, the data structure comprising a trie.

19. The system of claim 17, wherein the data structure is generated by inserting values into the trie according to the hash of the document.

20. The system of claim 15 wherein the proof is generated by searching the data structure for a digest of the document.

* * * * *